(12) United States Patent
Pabby et al.

(10) Patent No.: US 11,574,347 B2
(45) Date of Patent: Feb. 7, 2023

(54) SYSTEM FOR HIGH-SPEED BILLING TRANSACTION PROCESSING ON A PROCESSING CLUSTER

(71) Applicant: RIA Advisory LLC, Coral Gables, FL (US)

(72) Inventors: Saket Pabby, Coral Gables, FL (US); Supriya Mukhapadhyay, Naperville, IL (US); Unnikrishnan Gopinath, Kollam (IN)

(73) Assignee: RIA Advisory LLC, Coral Gables, FL (US)

( * ) Notice: Subject to any disclaimer, the term of this patent is extended or adjusted under 35 U.S.C. 154(b) by 913 days.

(21) Appl. No.: 16/288,622

(22) Filed: Feb. 28, 2019

(65) Prior Publication Data
US 2020/0279308 A1 Sep. 3, 2020

(51) Int. Cl.
*G06Q 30/04* (2012.01)
*G06F 16/27* (2019.01)

(52) U.S. Cl.
CPC ........... *G06Q 30/04* (2013.01); *G06F 16/278* (2019.01)

(58) Field of Classification Search
CPC ...... G06Q 30/04; G06Q 20/10; G06Q 20/102; G06F 16/278; G06F 16/2255
See application file for complete search history.

(56) References Cited

U.S. PATENT DOCUMENTS

| | | | |
|---|---|---|---|
| 2002/0010666 A1* | 1/2002 | Wright | H04M 15/44 705/34 |
| 2007/0265962 A1* | 11/2007 | Bowe | G06Q 20/102 705/40 |
| 2012/0265658 A1* | 10/2012 | Meier | G06Q 40/123 705/34 |
| 2014/0222669 A1* | 8/2014 | Novak | G06Q 30/04 705/40 |
| 2018/0074786 A1* | 3/2018 | Oberbreckling | G06F 16/25 |
| 2020/0065303 A1* | 2/2020 | Bhattacharjee | G06F 16/278 |
| 2020/0279308 A1* | 9/2020 | Pabby | G06F 16/278 |
| 2022/0312159 A1* | 9/2022 | Chiaverini | H04M 15/58 |

* cited by examiner

*Primary Examiner* — Florian M Zeender
*Assistant Examiner* — Milena Racic
(74) *Attorney, Agent, or Firm* — Terrile, Cannatti & Chambers, LLP; Emmanuel A. Rivera

(57) ABSTRACT

A method, system, and computer-readable medium are disclosed for executing high-speed transaction processing in a parallel processing environment. One embodiment is directed to a computer-implemented method for executing high-speed transaction processing in a processing cluster having a driver and a plurality of executors, each of the executors configured to process data in at least one respective partition. The driver may assign billing transaction data stored on a persistent datastore of a billing system to respective partitions of the plurality of executors for parallel processing. The driver and executors execute operations in which usage factors of the billing transactions are aggregated to generate billable charge information in a format for use by a billing system to generate billing invoices.

20 Claims, 17 Drawing Sheets

Raw transaction events

| Id | Primary Account | Txn Date | Product Identifier1 | Product Identifier2 | Secondary Account | Volume | Currency | Amount |
|---|---|---|---|---|---|---|---|---|
| T1 | A1 | D1 | P11 | P21 | A3 | 1 | C1 | 1 |
| T2 | A2 | D2 | P12 | P21 | | 1 | C1 | 2 |
| T3 | A3 | D1 | P11 | P21 | | 1 | C1 | 1 |
| T4 | A1 | D1 | P11 | P21 | A3 | 1 | C1 | 3 |
| T5 | A1 | D1 | P12 | P21 | | 1 | C2 | 1 |
| T6 | A2 | D1 | P12 | P21 | A3 | 1 | C1 | 1 |
| T7 | A2 | D2 | P12 | P21 | A3 | 1 | C1 | 2 |
| T8 | A3 | D1 | P12 | P21 | | 1 | C1 | 1 |
| T9 | A1 | D1 | P11 | P21 | | 1 | C1 | 3 |
| T10 | A1 | D1 | P11 | P21 | | 1 | C2 | 2 |
| T11 | A1 | D1 | P11 | P21 | | 1 | INVALID | 2 |
| T12 | INVALID | D1 | P11 | P21 | | 1 | C2 | 2 |

After read of raw data

Partition 1

| Id | Primary Account | Txn Date | Product Identifier1 | Product Identifier2 | Secondary Account | Volume | Currency | Amount |
|---|---|---|---|---|---|---|---|---|
| T1 | A1 | D1 | P11 | P21 | A3 | 1 | C1 | 1 |
| T2 | A2 | D2 | P12 | P21 |    | 1 | C1 | 2 |
| T3 | A3 | D1 | P11 | P21 |    | 1 | C1 | 1 |
| T4 | A1 | D1 | P11 | P21 | A3 | 1 | C1 | 3 |
| T5 | A1 | D1 |     |     |    | 1 | C2 | 1 |
| T6 | A2 | D1 | P12 | P21 | A3 | 1 | C1 | 1 |

Partition 2

| Id | Primary Account | Txn Date | Product Identifier1 | Product Identifier2 | Secondary Account | Volume | Currency | Amount |
|---|---|---|---|---|---|---|---|---|
| T7  | A2 | D1 | P12 | P21 | A3 | 1 | C1 | 2 |
| T8  | A2 | D2 | P12 | P21 |    | 1 | C1 | 1 |
| T9  | A3 | D1 | P11 | P21 |    | 1 | C2 | 3 |
| T10 | A1 | D1 | P11 | P21 |    | 1 | (INVALID) | 2 |
| T11 | A1 | D1 |     |     |    |   |    | 2 |
| T12 | (INVALID) | D1 |  |  |    | 1 | C2 | 2 |

Figure 8

After Validation

Partition 1

| Id | Primary Account | Txn Date | Product Identifier1 | Product Identifier2 | Secondary Account | Volume | Currency | Amount |
|----|----|----|----|----|----|----|----|----|
| T1 | A1 | D1 | P11 | P21 | A3 | 1 | C1 | 1 |
| T2 | A2 | D2 | P12 | P21 |    | 1 | C1 | 2 |
| T3 | A3 | D1 | P11 | P21 |    | 1 | C1 | 1 |
| T4 | A1 | D1 | P11 | P21 | A3 | 1 | C1 | 3 |
| T5 | A1 | D1 | P11 | P21 |    | 1 | C2 | 1 |
| T6 | A2 | D1 | P12 | P21 | A3 | 1 | C1 | 1 |

Partition 2

| Id | Primary Account | Txn Date | Product Identifier1 | Product Identifier2 | Secondary Account | Volume | Currency | Amount |
|----|----|----|----|----|----|----|----|----|
| T7  | A2 | D1 | P12 | P21 | A3 | 1 | C1 | 2 |
| T8  | A2 | D2 | P12 | P21 |    | 1 | C1 | 1 |
| T9  | A3 | D1 | P12 | P21 |    | 1 | C1 | 3 |
| T10 | A1 | D1 | P11 | P21 |    | 1 | C2 | 2 |

Figure 9

After Split and Key

Partition 1 — 1002

| Account | Date | Product Identifier 1 | Product Identifier 2 | Currency | Generated key | Id | Volume | Amount |
|---|---|---|---|---|---|---|---|---|
| A1 | D1 | P11 | P21 | C1 | K1 | T1 | 1 | 1 |
| A3 | D1 | P11 | P21 | C1 | K3 | T1 | 1 | 1 |
| A2 | D2 | P12 | P21 | C1 | K2 | T2 | 1 | 2 |
| A3 | D1 | P11 | P21 | C1 | K3 | T3 | 1 | 1 |
| A1 | D1 | P11 | P21 | C1 | K1 | T4 | 1 | 3 |
| A3 | D1 | P11 | P21 | C2 | K3 | T4 | 1 | 3 |
| A1 | D1 | P11 | P21 | C1 | K4 | T5 | 1 | 1 |
| A2 | D1 | P12 | P21 | C1 | K5 | T6 | 1 | 1 |
| A3 | D1 | P12 | P21 | C1 | K6 | T6 | 1 | 1 |

1006 — (Account column) 1010 — (Generated key column)

Partition 2 — 1004

| Account | Date | Product Identifier 1 | Product Identifier 2 | Currency | Generated key | Id | Volume | Amount |
|---|---|---|---|---|---|---|---|---|
| A2 | D1 | P12 | P21 | C1 | K5 | T7 | 1 | 2 |
| A3 | D1 | P12 | P21 | C1 | K6 | T7 | 1 | 2 |
| A2 | D2 | P12 | P21 | C1 | K2 | T8 | 1 | 1 |
| A3 | D1 | P12 | P21 | C1 | K6 | T9 | 1 | 3 |
| A1 | D1 | P11 | P21 | C2 | K4 | T10 | 1 | 2 |

1008 — (Account column) 1012 — (Generated key column)

Figure 10

After Partition By Account

Partition 1 — 1202

Business Transaction

| Key | Id | Account | Txn Date | Product Identifier1 | Product Identifier2 | Volume | Currency | Amount | Child Transactions |
|-----|-----|---------|----------|---------------------|---------------------|--------|----------|--------|---------------------|
| K1 | BT1 | A1 | D1 | P11 | P21 | 2 | C1 | 4 | T1,T4 |
| K3 | BT3 | A3 | D1 | P11 | P21 | 3 | C1 | 5 | T1,T3,T4 |
| K4 | BT4 | A1 | D1 | P11 | P21 | 2 | C2 | 3 | T5,T10 |
| K6 | BT6 | A3 | D1 | P12 | P21 | 3 | C1 | 6 | T6,T7,T9 |

Partition 2 — 1204

Business Transaction

| Key | Id | Account | Txn Date | Product Identifier1 | Product Identifier2 | Volume | Currency | Amount | Child Transactions |
|-----|-----|---------|----------|---------------------|---------------------|--------|----------|--------|---------------------|
| K2 | BT2 | A2 | D2 | P12 | P21 | 2 | C1 | 3 | T2,T8 |
| K5 | BT5 | A2 | D1 | P12 | P21 | 2 | C1 | 3 | T6,T7 |

Figure 12

After Rule derivation

Partition 1

| key | Business Transaction | | | | | | | | |
|---|---|---|---|---|---|---|---|---|---|
| | Id | Account | Txn Date | Product Identifier1 | Product Identifier2 | Volume | Currency | Amount | Child Transactions | Product |
| K1 | BT1 | A1 | D1 | P11 | P21 | 2 | C1 | 4 | T1,T4 | PR1 |
| K3 | BT3 | A3 | D1 | P11 | P21 | 3 | C1 | 5 | T1,T3,T4 | PR1 |
| K4 | BT4 | A1 | D1 | P11 | P21 | 2 | C2 | 3 | T5,T10 | PR1,PR2 |
| K6 | BT6 | A3 | D1 | P12 | P21 | 3 | C1 | 6 | T6,T7,T9 | PR3 |

1302

1304

1306

Partition 2

| key | Business Transaction | | | | | | | | |
|---|---|---|---|---|---|---|---|---|---|
| | Id | Account | Txn Date | Product Identifier1 | Product Identifier2 | Volume | Currency | Amount | Child Transactions | Product |
| K2 | BT2 | A2 | D2 | P12 | P21 | 2 | C1 | 3 | T2,T8 | PR3 |
| K5 | BT5 | A2 | D1 | P12 | P21 | 2 | C1 | 3 | T6,T7 | PR3 |

After Price Resolution

Partition 1 — 1402

| key | Id | Account | Txn Date | Product Identifier1 | Product Identifier2 | Volume | Currency | Amount | Child Transactions | Product | Price Assignment |
|---|---|---|---|---|---|---|---|---|---|---|---|
| K1 | BT1 | A1 | D1 | P11 | P21 | | 2 | C1 | 4 T1,T4 | PR1 | PA1 |
| K3 | BT3 | A3 | D1 | P11 | P21 | | 3 | C1 | 5 T1,T3,T4 | PR1 | PA2 |
| K4 | BT4 | A1 | D1 | P11 | P21 | | 2 | C2 | 3 T5,T10 | PR1,PR2 | PA1,PA3 |
| K6 | BT6 | A3 | D1 | P12 | P21 | | 3 | C1 | 6 T6,T7,T9 | PR3 | PA4 |

1406

Partition 2 — 1404

| key | Id | Account | Txn Date | Product Identifier1 | Product Identifier2 | Volume | Currency | Amount | Child Transactions | Product | Price Assignment |
|---|---|---|---|---|---|---|---|---|---|---|---|
| K2 | BT2 | A2 | D2 | P12 | P21 | | 2 | C1 | 3 T2,T8 | PR3 | PA5 |
| K5 | BT5 | A2 | D1 | P12 | P21 | | 2 | C1 | 3 T6,T7 | PR3 | PA6 |

After Usage Aggregation

| key | Id | Account | Txn Date | Product Identifier1 | Product Identifier2 | Volume | Currency | Amount | Child Transactions | Product | Price Assignment |
|---|---|---|---|---|---|---|---|---|---|---|---|
| K3 | BT3 | A3 | D1 | P11 | P21 | 3 | C1 | 5 | T1,T3,T4 | PR1 | PA2 |
| K1 | BT1 | A1 | D1 | P11 | P21 | 4 | C1 | 10 | T1,T4 | | PA1 |
| K4 | BT4 | A1 | D1 | P11 | P21 | 2 | C2 | 3 | T5,T10 | PR2 | PA3 |
| K6 | BT6 | A3 | D1 | P12 | P21 | 3 | C1 | 6 | T6,T7,T9 | PR3 | PA4 |

Partition 1 — 1502; 1506; 1510

| key | Id | Account | Txn Date | Product Identifier1 | Product Identifier2 | Volume | Currency | Amount | Child Transactions | Product | Price Assignment |
|---|---|---|---|---|---|---|---|---|---|---|---|
| K2 | BT2 | A2 | D2 | P12 | P21 | 2 | C1 | 3 | T2,T8 | PR3 | PA5 |
| K5 | BT5 | A2 | D1 | P12 | P21 | 2 | C1 | 3 | T6,T7 | PR3 | PA6 |

Partition 2 — 1504; 1508; 1512

Figure 15

After Rate calculation

Partition 1 — Business Transaction (1602)

| key | id | Account | Txn Date | Product Identifier1 | Product Identifier2 | Volume | Currency | Amount | Child Transactions | Product | Price Assignment | Calc Id | Calculated Amount |
|---|---|---|---|---|---|---|---|---|---|---|---|---|---|
| K3 | BT3 | A3 | D1 | P11 | P21 | 3 | C1 | 5 | T1,T3,T4 | PR1 | PA2 | RC1 | 5.00 |
| K1 | BT1 | A1 | D1 | P11 | P21 | | C1 | 10 | T1,T4 | PR1 | PA1 | RC2 | 10.00 |
| K4 | BT4 | A1 | D1 | P11 | P21 | 2 | C2 | 3 | T5,T10 | PR2 | PA3 | RC3 | 3.00 |
| K6 | BT6 | A3 | D1 | P12 | P21 | 3 | C1 | 6 | T6,T7,T9 | PR3 | PA4 | RC4 | 6.00 |

1606 → (Calc Id: RC1–RC4); 1610 → (Calculated Amount: 5.00–6.00)

Partition 2 — Business Transaction (1604)

| key | id | Account | Txn Date | Product Identifier1 | Product Identifier2 | Volume | Currency | Amount | Child Transactions | Product | Price Assignment | Calc Id | Calculated Amount |
|---|---|---|---|---|---|---|---|---|---|---|---|---|---|
| K2 | BT2 | A2 | D2 | P12 | P21 | | C1 | 3 | T2,T8 | PR3 | PA5 | RC5 | 3.00 |
| K5 | BT5 | A2 | D1 | P12 | P21 | | C1 | 3 | T6,T7 | PR3 | PA6 | RC6 | 3.00 |

1608 → (Calc Id: RC5, RC6); 1612 → (Calculated Amount: 3.00, 3.00)

Figure 16

After Bill Charge Generation

Partition 1
Business Transaction

| key | Id | Account | Txn Date | Product Identifier1 | Product Identifier2 | Volume | Currency | Amount | Child Transactions | Product | Price Assignment | Calc Id | Bill Charge Id | Calculated Amount | Bill Charge Details |
|---|---|---|---|---|---|---|---|---|---|---|---|---|---|---|---|
| K3 | BT3 | A3 | D1 | P11 | P21 | 3 | C1 | 5 | T1,T3,T4 | PR1 | PA2 | RC1 | B1 | 5.00 | BC1 |
| K1 | BT1 | A1 | D1 | P11 | | | C1 | | T1,T4 | | | | | | |
| | | | | | | 4 | | 10 | | PR1 | PA1 | RC2 | B2 | 10.00 | BC2 |
| K4 | BT4 | A1 | D1 | P11 | P21 | 2 | C2 | 3 | T5,T10 | PR2 | PA3 | RC3 | B3 | 3.00 | BC3 |
| K6 | BT6 | A3 | D1 | P12 | P21 | 3 | C1 | 6 | T6,T7,T9 | PR3 | PA4 | C4 | B4 | 6.00 | BC4 |

1702 → 1704, 1706 (B1, B2, B3, B4) → 1710 (BC1, BC2, BC3, BC4)

Partition 2
Business Transaction

| key | Id | Account | Txn Date | Product Identifier1 | Product Identifier2 | Volume | Currency | Amount | Child Transactions | Product | Price Assignment | Calc Id | Bill Charge Id | Calculated Amount | Bill Charge Details |
|---|---|---|---|---|---|---|---|---|---|---|---|---|---|---|---|
| K2 | BT2 | A2 | D2 | P12 | P21 | 2 | C1 | 3 | T2,T8 | PR3 | PA5 | RC5 | B5 | 3.00 | BC5 |
| K5 | BT5 | A2 | D1 | P12 | P21 | | C1 | 3 | T6,T7 | PR3 | PA6 | RC6 | B6 | 3.00 | BC6 |

SYSTEM FOR HIGH-SPEED BILLING TRANSACTION PROCESSING ON A PROCESSING CLUSTER

BACKGROUND OF THE INVENTION

Field of the Invention

The present invention relates in general to the field of computers and similar technologies, and in particular to hardware and software utilized in this field. Still more particularly, it relates to a method, system, and computer-usable medium for high-speed billing transaction processing on a processing cluster.

Description of the Related Art

Institutions, such as large utilities and financial services institutions, process high volumes of transactions and convert them into billable items to, for example, invoice users for usage of their products and services. Existing transaction processing solutions, however, are unable to address the increasing need to process such high transaction volumes in a timely manner.

One example of an existing transaction processing solution is the Oracle Revenue Management and Billing (ORMB) system. ORMB systems store billable transactions to persistent storage. The billable transactions are accessed from persistent storage and processed in a sequential series of batch operations. Upon completion of each batch operation, the results of the operation are stored in, for example, a database for use by the next batch operation in the sequence. These operations can be time-consuming and resource intensive, requiring execution of significant maintenance procedures. Benchmarks have shown that processing thirty million transactions using such a sequential batch system may take as much as thirteen hours. Further, exceptions occurring during the run of a particular batch operation holds up processing for all subsequent batch operations, sometimes requiring a restart or rerun of one or more prior batch operations.

SUMMARY OF THE INVENTION

A system of one or more computers can be configured to perform particular operations or actions by virtue of having software, firmware, hardware, or a combination of them installed on the system that in operation causes or cause the system to perform high-speed transaction processing in a parallel processing environment. One or more computer programs can be configured to perform particular operations or actions by virtue of including instructions that, when executed by data processing apparatus, cause the apparatus to perform high-speed transaction processing in a parallel processing environment.

One general aspect includes a computer-implemented method for executing high-speed transaction processing in a processing cluster having a driver and a plurality of executors, each of the executors configured to process data in at least one respective partition, the computer-implemented method including: mapping billing transaction data stored on a persistent datastore of a billing system to respective partitions of the plurality of executors, where different sets of billing transaction data are mapped to different partitions for parallel processing of the billing transaction data, where the billing transaction data includes at least a transaction date, an account ID, a product ID, and a usage factor for the billing transaction; generating, by each executor, a key for each billing transaction in the respective partition, where the key is generated based, at least in part, on the account ID, transaction date, and product ID of the billing transaction; shuffling, by the driver, the keyed billing transactions on the respective partitions of the plurality of executors to generate a set of transactions aggregated by the same key; mapping, by the driver, the set of aggregated transactions to partitions of the plurality of executors so that no two partitions have an aggregated transaction for the same account ID; aggregating, by the executor, usage factors of the billing transactions in the respective partition to generate billable charge information in a format for use by the billing system to generate billing invoices; and storing, by the executor, the billable charge information on a persistent datastore of the billing system. Other embodiments of this aspect include corresponding computer systems, apparatus, and computer programs recorded on one or more computer storage devices, each configured to perform the actions of the methods.

Another general aspect includes a computer-implemented method for executing high-speed transaction processing in a cluster having a billing driver and a plurality of parallel operating executors, the method including: assigning, by the driver, a range of raw billing transactions that are to be respectively processed by each executor of the plurality of parallel operating executors; accessing, by each of the plurality of parallel operating executors, raw billing transaction data assigned to the respective executor by the driver, where the executors access the raw billing transaction data from a persistent datastore of a billing system, where different executors access different sets of raw billing transaction data for parallel processing in the cluster, where the raw billing transaction data for a billing transaction includes at least a transaction ID, a transaction date, an account ID, and a product ID, a transaction rate, and a transaction volume; mapping, by the executor, the set of accessed transactions to a raw billing transaction dataframe of the executor; validating, by the executor, the set of accessed transactions in the raw billing transaction dataframe to generate a validated transaction dataframe; generating, by the executor, a keyed transaction dataframe from the validated transaction dataframe, where each transaction in the keyed transaction dataframe includes a key generated, at least in part, from the account ID, transaction date, product ID, and amount of a corresponding transaction in the validated transaction dataframe; shuffling, by the driver of the cluster, the keyed transaction dataframes of the plurality of executors to generate an aggregated transaction dataframe at the driver, where the aggregated transaction dataframe is aggregated by the same key; partitioning, by the driver, the set of aggregated transactions to partitions of the plurality of executors so that no two partitions have an aggregated transaction for a same account ID; processing, by the executor, the set of aggregated transactions in the corresponding partition to generate billable charge information; and storing, by the executor, the billable charge information on persistent datastore of the billing system. Other embodiments of this aspect include corresponding computer systems, apparatus, and computer programs recorded on one or more computer storage devices, each configured to perform the actions of the methods.

Another general aspect includes a system for executing high-speed transaction processing, the system having a processing cluster, the processing cluster including: a billing driver; a plurality of executors in communication with the billing driver, where each of the plurality of executors include a respective cache memory; where the billing driver is configured to assign a subset of raw billing transactions to each executor for processing, where the billing driver assigns different subsets of raw billing transactions to different executors, where billing transactions in the subset of raw billing transaction include at least a transaction date, an account ID, a product ID, and a usage factor for the billing transaction; where the executors are configured to access the assigned subset of raw billing transactions from persistent storage of a billing system; execute pre-processing operations on the assigned subset of raw billing transactions to generate a keyed transaction data object that is aggregated by key, where the key is generated based, at least in part, on the account ID, transaction date, and product ID of each transaction; where the billing driver is further configured to shuffle the keyed billing transaction data objects retrieved from partitions of the plurality of executors to generate a set of transactions aggregated by the same key; map the set of aggregated transactions to partitions of the plurality of executors so that no two partitions have an aggregated transaction for the same account ID; where the executors are further configured to aggregate usage factors of the billing transactions in the respective partition to generate billable charge information in a format for use by the billing system to generate billing invoices; and store the billable charge information on a persistent datastore of the billing system. Other embodiments of this aspect include corresponding computer systems, apparatus, and computer programs recorded on one or more computer storage devices, each configured to perform the actions of the methods.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 8 shows one example of dataframes in partitions storing raw transaction events;

FIG. 9 shows one example of validated dataframes in separate partitions;

FIG. 10 shows an example of split and keyed dataframes;

FIG. 12 shows one example in which the billing event driver has partitioned the show full and aggregated transactions into partitions;

FIG. 13 shows one example of dataframes resulting from the application of rules to the dataframes of FIG. 12;

FIG. 14 shows one example of dataframes resulting from application of price resolution rules to the dataframes of FIG. 13;

FIG. 15 shows dataframes that have been generated based on usage aggregation of the dataframes shown FIG. 14;

FIG. 16 shows dataframes that have been generated after applying rate calculation rules to the dataframes shown FIG. 14; and FIG. 17 shows dataframes that have been generated based billing rules applied to the dataframes shown FIG. 14.

DETAILED DESCRIPTION

A method, system and computer-usable medium are disclosed for high-speed, high-volume billing transaction processing. Certain aspects of the disclosure recognize that it is desirable to reduce the time required to execute processing on high-volume billing transactions. Certain aspects of the disclosure also recognize that existing batch transaction systems are not scalable for reducing the time required to process such high-volumes of billing transactions. For example, increasing the number of threads executed during a batch processing operation on a high number of billing transactions does not necessarily reduce the processing time required to complete the batch operation.

Certain aspects of the present disclosure recognize the increased efficiency and scalability that may be obtained through parallel processing of billing transaction data. Certain aspects of the present disclosure also recognize that there are advantages to employing certain parallel processing architectures in high-volume, high-speed billing transaction processing. Certain aspects of the present disclosure also recognize that there are substantial problems that are unique to executing high-volume, high-speed billing transaction processing in a parallel processing environment.

Figure 1:
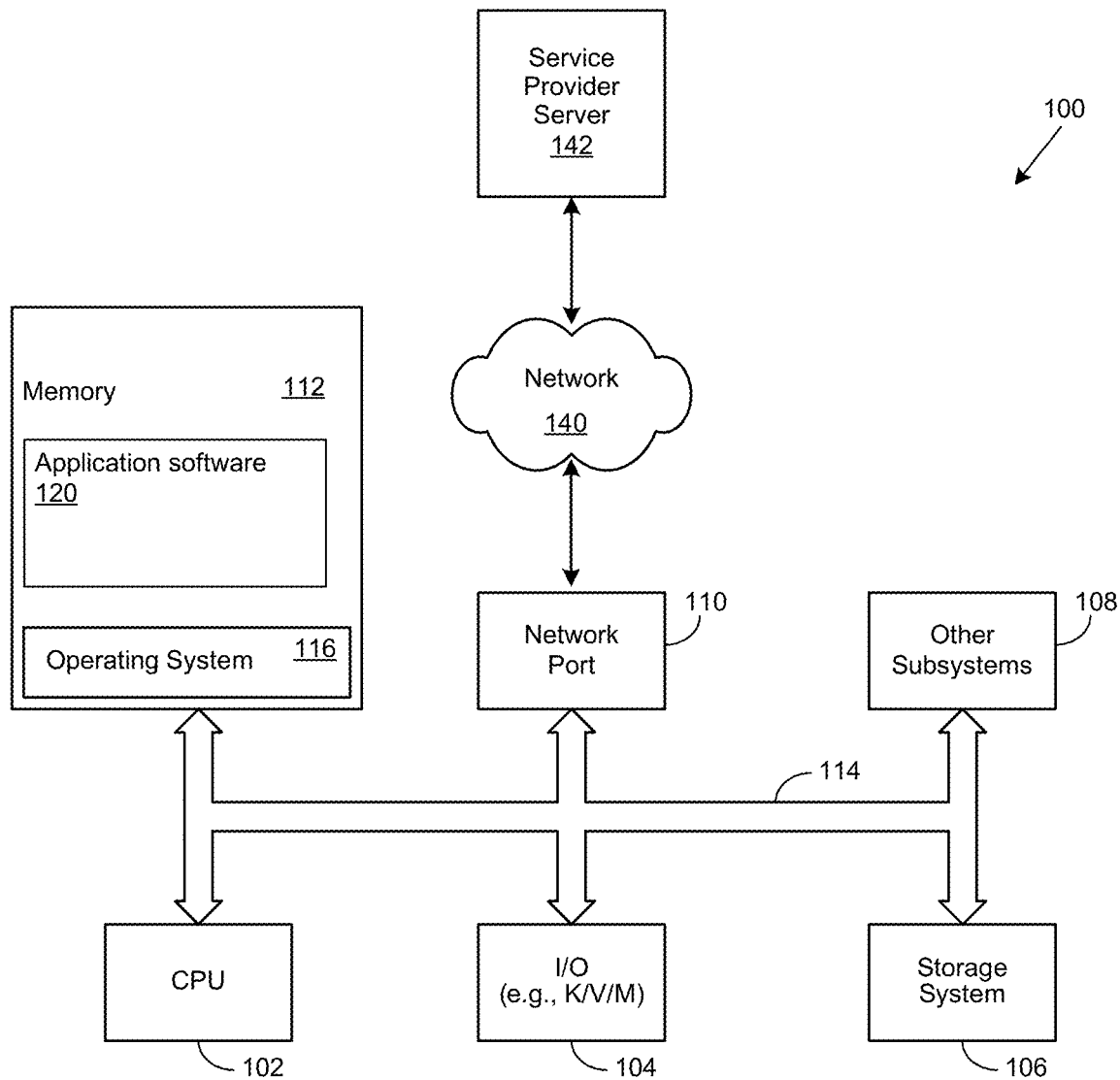
FIG. 1 depicts an exemplary computer in which the present invention may be implemented.

FIG. 1 is a generalized illustration of an information handling system 100 that can be used to implement certain embodiments of the present invention. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

As shown in FIG. 1, the information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which may be accessible by a service provider server 142. The information handling system 100 likewise includes system memory 112, which is interconnected to the foregoing via one or more buses 114. System memory 112 further includes operating system (OS) 116 and in various embodiments may also include application software 120. In certain embodiments, the application software 120 configures the operation of the information processing system 100 as a driver in a parallel processing environment. In certain embodiments, the application software 120 configures the operation of the information processing system 100 as a worker in the parallel processing environment, in certain embodiments, the application software 120 configures the worker with one or more executors used in the parallel processing environment. In certain embodiments, the information handling system 100 is able to download the application software 120 from the service provider server 142. In another embodiment, the information handling system 100 is configured to provide the application software 120 as a service from the service provider server 142.

Figure 2:
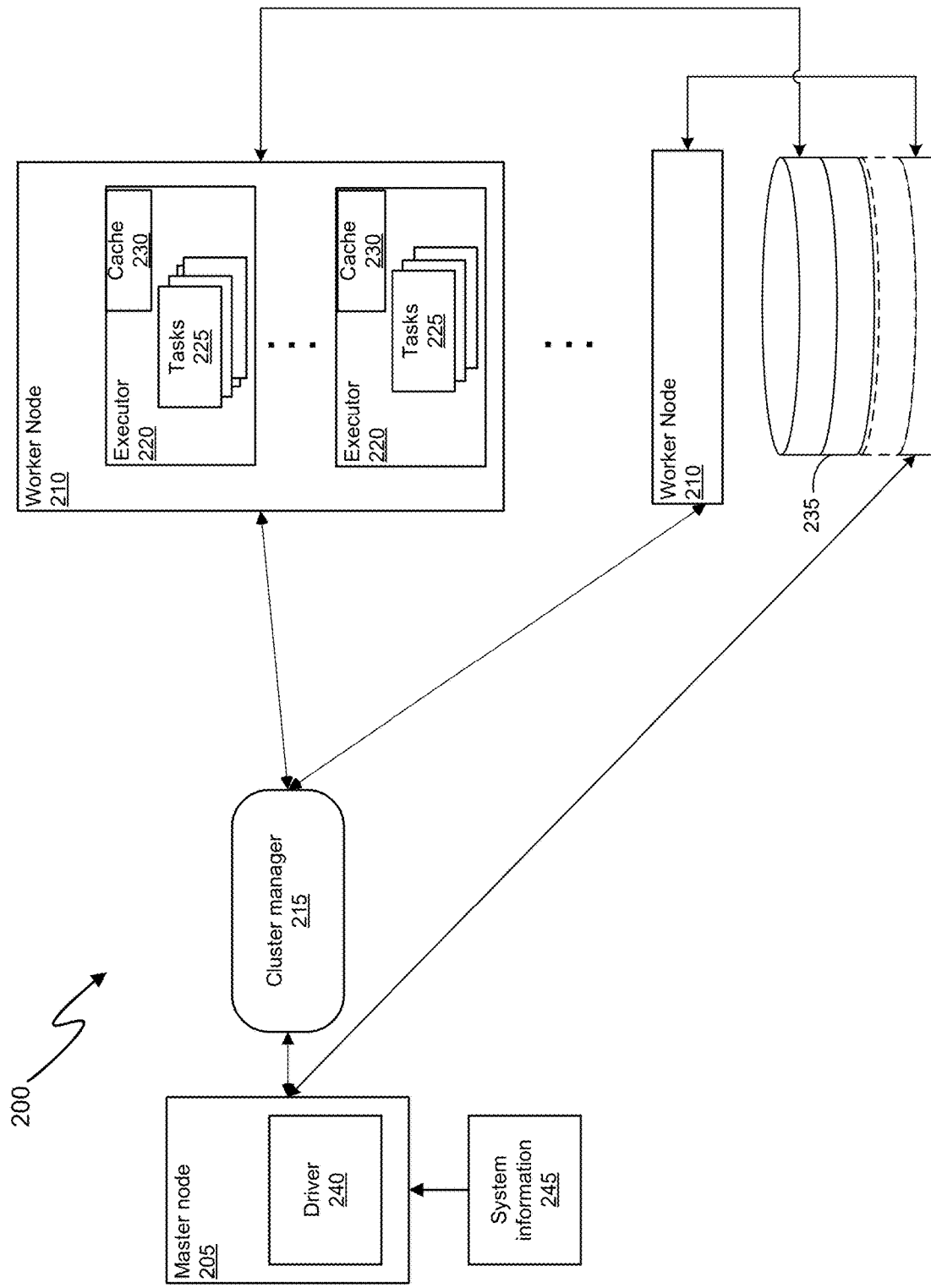
FIG. 2 depicts a processing cluster that may be used to implement certain embodiments of the disclosed system.

FIG. 2 depicts a processing cluster 200 that may be used to implement certain embodiments of the present invention. In certain embodiments, the processing cluster 200 may be implemented using a SPARK application executed on multiple CPUs of the cluster.

In certain embodiments, the cluster 200 includes a master node 205, a plurality of worker nodes 210, and a cluster manager 215. In certain embodiments, the master node 205 and worker nodes 210 are executed on separate machines within the cluster 200. In certain embodiments, each worker node 210 is in communication with the master node 205 and, further, is configured to access raw billing events from persistent storage 235 of a billing system.

In certain embodiments, each worker node 210 includes at least one executor 220 that can process raw billing events retrieved from persistent storage 235. In certain embodiments, a machine operating as a worker node 210 may include multiple processing cores thereby allowing the machine to implement multiple executors 220. In certain embodiments, the executor 220 executes a plurality of in-memory tasks 225 on transaction data retrieved from persistent storage 235. In certain embodiments, the in-memory tasks 225 are executed within cache memory 230 respectively associated with the executor 220.

In certain embodiments, the master node 205 executes a driver 240, which is responsible for maintaining information about the operation of the applications running on the cluster 200, as well as analyzing, distributing, and scheduling processing of raw billing events across the executors 220. In certain embodiments, the executors 210 are responsible for carrying out the tasks on transaction data that the driver 240 assigns them. In certain embodiments, each executor 220 is responsible for executing code assigned to it by the driver 240, and reporting the state of the computation of that executor 220 back to the driver 240. In certain embodiments, driver 240 uses information included in a system information file 245 to determine the configuration of the cluster 200. As an example, such system information may include the number of worker nodes 210, the number of cores on each worker node, the number of executors 220 on the worker nodes 210, etc.

Figure 3:
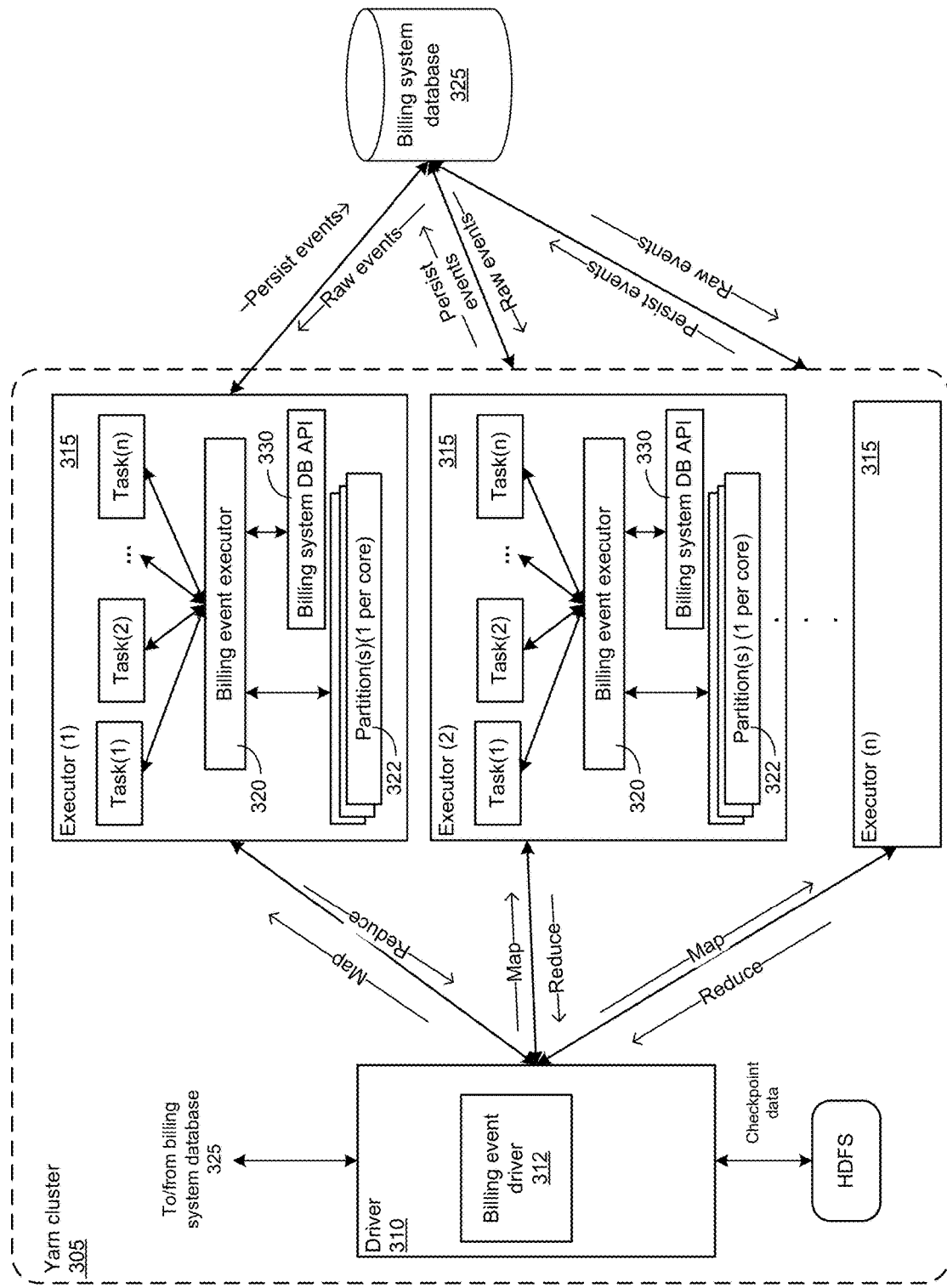
FIG. 3 depicts a high-level functional block diagram showing one embodiment of the disclosed system.

FIG. 3 depicts a high-level functional block diagram showing one embodiment of a system implementing certain embodiments of the present invention. In this example, the system is implemented in a SPARK application where the billing transaction processing takes place within a YARN cluster 305. Based on the teachings of the present disclosure, it will be recognized that other cluster platforms, such as those based on a MESO cluster, may be used.

In the example shown in FIG. 3, the YARN cluster includes a driver machine 310 executing a billing event driver 312 that is in communication with a plurality of executors 315, shown here as Executor(1) through Executor(n). Each executor 315 may include a respective billing event executor 320. In certain embodiments, the billing event driver 312 assigns raw billing events to each executor 315 for processing by its respective billing event executor 320. In certain embodiments, the raw billing events are assigned in a map operation.

In certain embodiments, each billing event executor 320 retrieves its assigned raw billing transactions from a billing system database 325 through a respective billing system DB API 330 and places the retrieved data in at least one respective partition 322 of the executor 315. In certain embodiments multiple processing cores may be assigned to a single executor 315. In such instances, each core of the single executor 315 may execute processing operations on a single partition. As such, it is possible for a single executor 315 to execute operations on multiple partitions, depending on the number of cores assigned to the executor 315.

The billing event executor 320 may execute a plurality of tasks on the assigned raw billing events in the respective partition 322 of the executor 315, the tasks being shown here as Task(1) through Task(n) and described in detail herein. In certain embodiments, the billing event executor 320 schedules a reduction operation with the billing event driver 312 upon completion of certain tasks. In certain embodiments, a reduction operation may take place in two stages. First, the driver 312 may direct each executor to perform a 'local' reduction operation in which data in the partitions are within each executor itself. In certain embodiments, this local reduction operation is followed by a 'global' reduction in which data is reduced across multiple executors within the driver. Billing transaction objects generated as a result of the global reduction operations are then re-partitioned across the executors 315 so that no single executor processes transactions for the same account.

In certain embodiments upon completion of processing of all billing transaction events by the billing event executor 320, the billing event executor 320 persists the processed billing transactions in the billing system database 325 as aggregated transaction data. The aggregated transaction data corresponds to the raw transaction events assigned to the billing event executor 320. In certain embodiments, the aggregated transactions may be used for subsequent billing operations, such as the preparation of customer invoices. Additionally, or in the alternative, the persisted data may include aggregated data that may be used to track or identify various characteristics of the raw transaction events.

In certain embodiments, a parallel processing cluster, such as YARN cluster 305, may be incorporated as an add-on to an existing billing system framework. In such instances, the format of the raw transaction events stored on the billing system database 325, and the format of the processed billing transaction data needed for preparing customer invoices are already established by the existing system. As such, the parallel processing cluster may be readily designed to handle and processes transactions using the standards of the existing billing system framework. As an example, a parallel processing cluster may be implemented within an ORMB framework as a substitute for the batch operations executed in the standard ORMB system.

Figure 4:
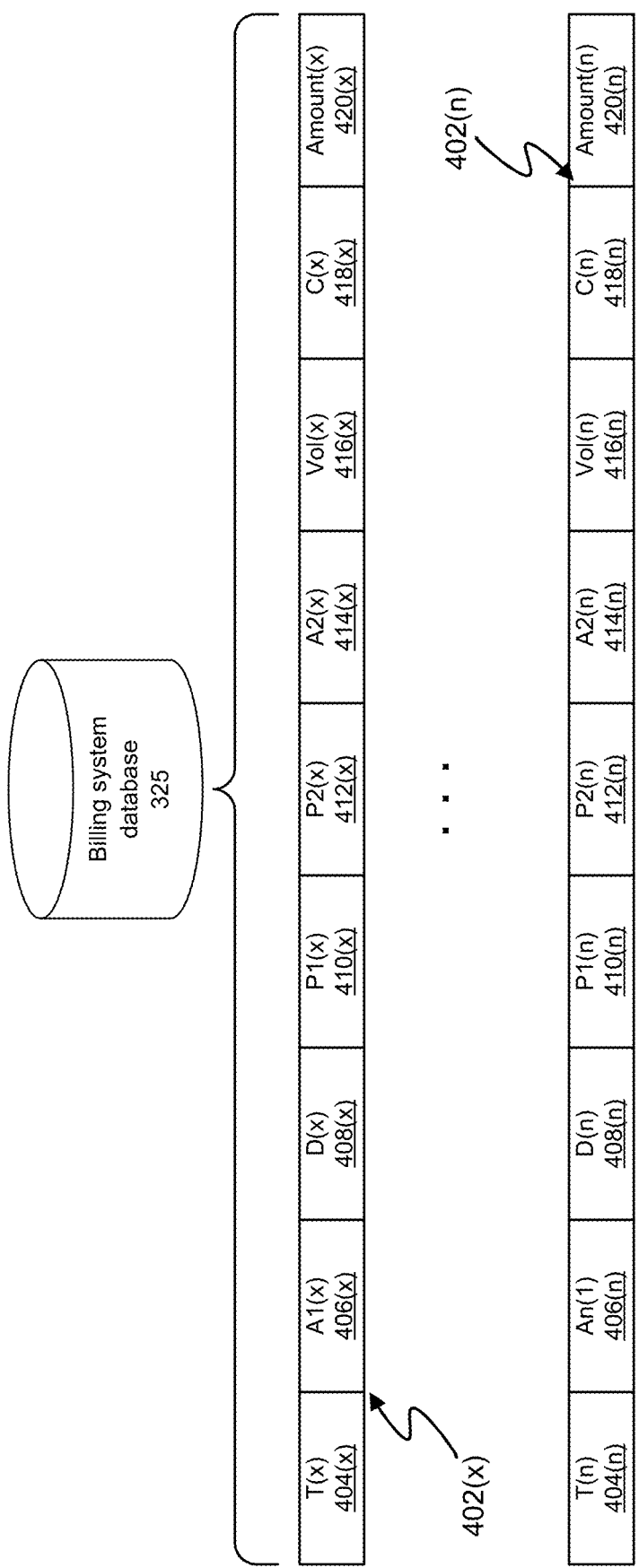
FIG. 4 depicts exemplary information that may be included in raw transaction events stored in a billing system database.

FIG. 4 depicts exemplary information that may be included in raw transaction events 402(x) through 402(n) stored in the billing system database 325. In certain embodiments, the raw transaction event 402 includes a transaction ID 404 (e.g. an index number of the transaction), a primary account ID (e.g., an identifier for the primary account that is to be billed for the transaction), a transaction date 408 (e.g., the date and/or time at which the transaction took place). Certain embodiments may also include a volume value 416 (e.g., a value corresponding to the number of transactions taking place in the raw transaction, typically 1 in a single raw transaction), a currency ID (e.g., a value corresponding to the type of currency that is to be used in the transaction, such as dollars, euros, Yen, etc.), and an amount value 420 (e.g., total amount of the purchase, the swiped amount of a purchase in a point-of-sale transaction, etc.).

In certain embodiments, the raw transaction events 402 also identify the products that are involved in the transaction. In certain embodiments, a single transaction may involve multiple products and, as such, the products are identified in the respective raw billing event. In the example shown in FIG. 4, the transaction events include a first product ID 410 (e.g., an identifier for a first product that is part of the raw transaction event) and a second product ID 412 (e.g., an identifier for a second product that is part of the raw billing event). As an example, the first product ID 410 may indicate that the transaction involved a withdrawal of funds, while the second product ID 412 may be a product identifier that indicates that the transaction occurred on a mobile platform.

In certain embodiments, the raw transaction events 402 also include a secondary account 414, identifying a secondary account that is to be billed for the transaction. As an example, a transaction may include a primary account ID corresponding to a financial institution, while the secondary account ID corresponds to the account of the individual user that made the transaction. Another example involving multiple accounts is a wire transfer transaction. In a wire transfer transaction, there are at least two parties—the account transferring the funds, and the account of the beneficiary. In view of the teachings of the present disclosure, those skilled in the art will recognize that the raw billing events 402 may include a greater number or fewer number of identifiers than those illustrated in FIG. 4, depending on the requirements of the billing system.

Figure 5:
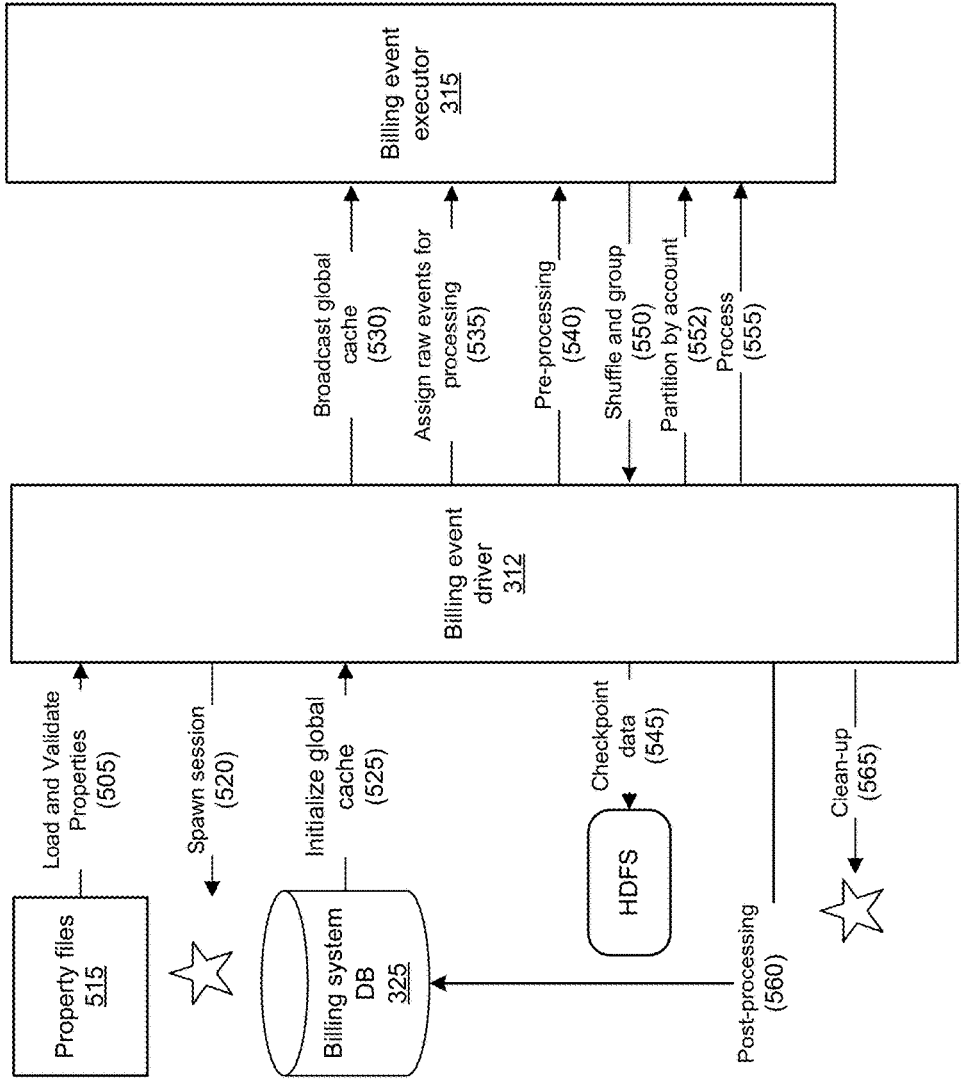
FIG. 5 is a high-level block diagram showing an example of the responsibilities that the billing event driver may have with respect to the billing event executor in certain embodiments of the disclosed system.

FIG. 5 is a high-level block diagram showing an example of the responsibilities that the billing event driver 312 may have with respect to the billing event executor 315 in certain embodiments of the disclosed system. In certain embodiments, the billing event driver 312 loads and validates initial properties stored in one or more property files 515. In certain embodiments, the property files may identify the amount of memory needed by each executor to accomplish its tasks, the number of executors that are in the cluster to which the billing event driver 312 is to assign raw billing events for processing, the logical location of the billing system database 325, etc.

In the example shown in FIG. 5, the billing event driver spawns a transaction processing session at operation 520. In certain embodiments, the session may be spawned as a SPARK application. At operation 530 of this example, the billing event driver 312 may communicate with the billing system database 325 to initialize a global cache, which is then communicated to the billing event executors 315. In certain embodiments, the global cache holds all the 'reference data and rules' required to process a transaction (e.g., Account Information (to validate and resolve accounts), Product Information, aggregation rules, Applicable Pricing, etc.).

At operation 535 of this example, the billing event driver 312 assigns which of the raw billing events (e.g., which subset of the total raw billing events) are to be accessed and processed by the billing event executor 315. In certain embodiments, each billing event executor 315 is assigned a different set of raw billing events that the billing event executor 315 is to process. At operation 540, the billing event driver 312 may direct the billing event executor 315 to begin executing pre-processing tasks on the assigned raw billing events. In certain embodiments, once the billing event executors have completed pre-processing of the assigned raw event transactions, the billing event driver 312 executes a shuffle and group operation on data in the collective partitions of all of the billing event executors. At operation 545, the shuffled and grouped data may be checkpointed and stored in persistent storage, such as in an HDFS file. Upon completion of the shuffle and group operation, the billing event driver 312 may partition the shuffled and grouped transactions by account at operation 552. In certain embodiments, the partitioning of the transactions by account between the billing event executors ensures that no single partition processes billing transactions for the same account ID.

At operation 555, certain embodiments of the billing event driver 312 direct the billing event executors 315 to process the data assigned to its partition. Once the billing event executors have completed their processing, the billing event driver 312 may execute post-processing at operation 560. During such post-processing, the billing event driver 312 may execute any tasks needed to close the processing session with the billing system database 325. At operation 565, the billing event driver 312 may close the session during which the checkpointed data is deleted, and the caches are cleaned.

Figure 6:
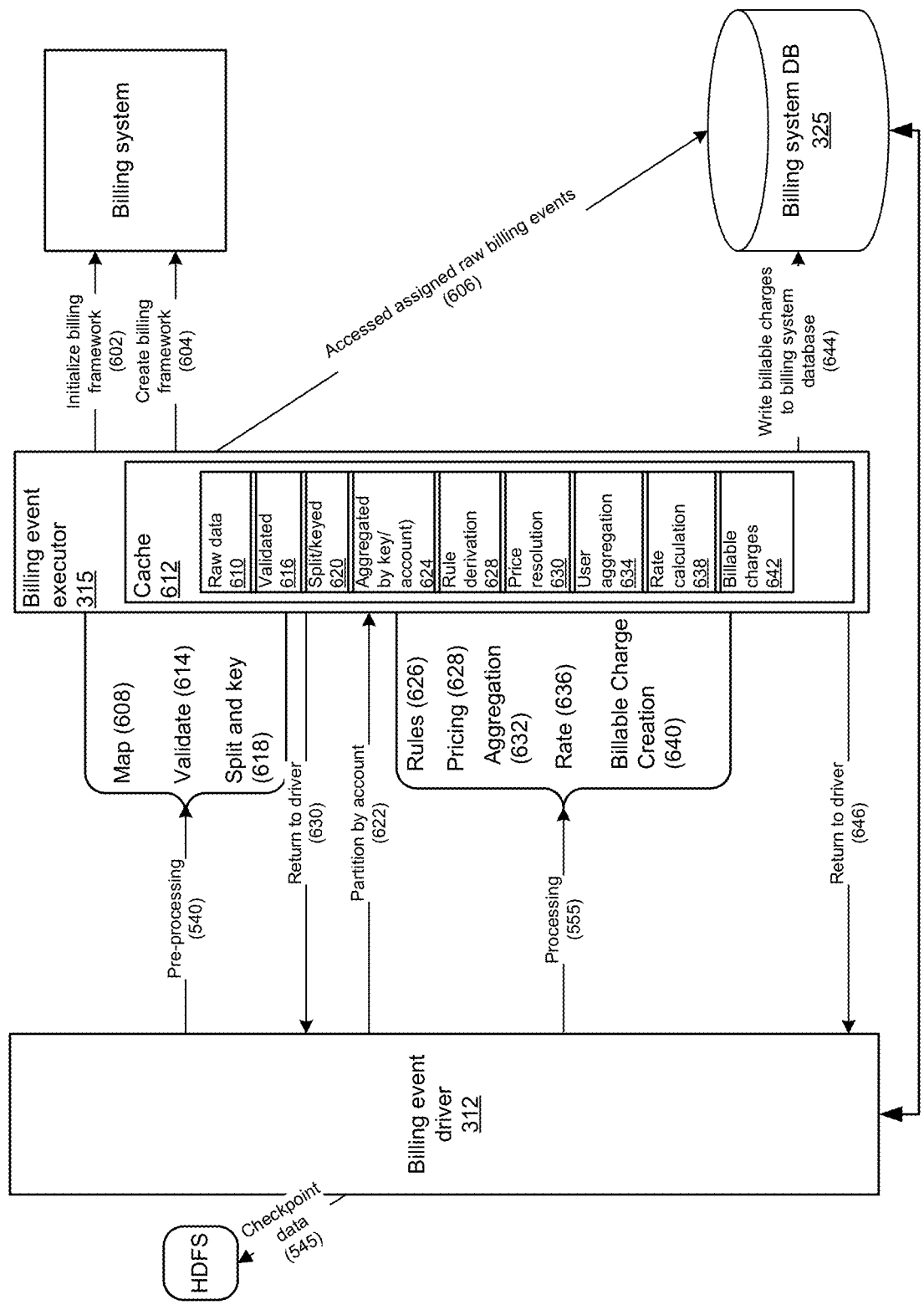
FIG. 6 is a high-level block diagram showing one example of the responsibilities that the billing event executor may have with respect to the billing event driver in certain embodiments of the disclosed system.

FIG. 6 is a high-level block diagram showing one example of the responsibilities that the billing event executor 315 may have with respect to the billing event driver 312 in certain embodiments of the disclosed system. In this example, the billing event executor 315 initializes the billing framework with the billing system at 602 and creates the billing framework for its assigned raw billing events at 604. In certain embodiments, the billing event executor 315 performs the pre-requisites required for its operation at 604. Such operations may include establishing a connection with the billing system database and with the billing system framework and calling the initialization routine of the billing system framework. In response to the direction from the billing event driver 312 at 540 to initiate pre-processing, the billing event executor 315 accesses the raw billing events assigned to the billing event executor 315 at 606.

In the example shown in FIG. 6, the billing event executor 315 is responsible for various tasks during the pre-processing operations. In the example shown in FIG. 6, the preprocessing operations include a mapping operation 608 in which the raw billing events are mapped to a raw billing event dataframe 610. In certain embodiments, the raw billing events are used by the billing event executor 315 to create a Resilient Distributed Dataset (RDD).

In certain embodiments, the raw billing event dataframe 610 is immutable and is stored in the cache 612 of the billing event executor 315. As used herein, transformations, aggregations, etc., do not change the content or structure of an immutable dataframe. Rather, such transformations, aggregations, etc., may result in new immutable dataframes that are generated from existing immutable dataframes. This allows in-memory processing of the dataframes in a partition without costly intermittent storage of the dataframes to persistent storage during the pre-processing and processing operations.

Certain embodiments execute a validation operation at 614 to filter any invalid data found in the raw billing event dataframe 610. In certain embodiments, the filtered data is used to generate a validated dataframe 616 that is stored, for example, in cache 612. In certain embodiments, the validated dataframe 616 is immutable.

Certain embodiments execute a split and key operation at 618 on the validated dataframe 616. In certain embodiments, a split operation is executed to ensure that each account in the validated dataframe 616 is associated with its own individual transaction. Such split operations may be executed when there is more than one account associated with a given transaction. In such instances, the transaction is split into multiple transactions, each associated with a corresponding account.

In certain embodiments, the split transactions are keyed to generate key identifiers using at least the account ID, transaction date, and product IDs associated with each of the split transactions. In certain embodiments, the transaction data also includes a currency ID, which may be used in conjunction with the account ID, transaction date, and product IDs to generate the key identifiers. Certain embodiments generate the key as a hash using the account ID, transaction date, and first product ID. It will be recognized by those skilled in the art, based on the teachings of the present disclosure, that various manners of generating the key may be employed so long as the key may be used to aggregate information for transactions associated with a particular account.

In certain embodiments, the split and keyed transactions are stored as an immutable split/keyed dataframe 620 in cache 612. At operation 622, the billing event executor 315 may notify the billing event driver 312 that pre-processing operations are complete and that the split/keyed dataframe 620 is available to the billing event driver 312 for shuffle and aggregation operations.

In certain embodiments, a split/keyed dataframe 620 will be available from each of the billing event executors 315 on the cluster. In certain embodiments, the pre-processing operations may result in transactions having the same key on different billing event executors. As such, certain embodiments of the billing event driver 312 wait until all of the billing event executors 315 of the cluster have notified the billing event driver 312 that their respective pre-processing operations have been completed before executing any shuffle and aggregation operations.

As described in further detail herein, the shuffle and aggregation operations executed by the billing event driver 312 on the split/keyed dataframes results in a centralized dataframe at the billing event executor 312 having information, such as volume and amount data, that have been aggregated by key. The aggregated volume and aggregated amount data, in certain embodiments, represents sum of the total volume and total amount of all transactions having the same key. At operation 622, the billing event driver 312 may assign transactions in the centralized dataframe to the billing event executors 315 for processing. In certain embodiments, the billing event driver 312 partitions the centralized dataframe to the billing event executors such that no single billing event executor performs processing on transactions of the same account. The billing event executors 315, in certain embodiments, store the assigned keyed transactions in an aggregated by key/account dataframe 624 in cache 612. In certain embodiments, the dataframe 624 is an immutable object.

Certain embodiments of the billing event executor 315 begin processing the aggregated by key/account dataframe 617 in response to the billing event driver prompt 555. In the example shown in FIG. 6, the billing event executor 315 applies rules at operation 626 to the dataframe 624 to generate an immutable dataframe 628 in which specific rules have been applied to the content of the dataframe 624. As an example, a transaction in dataframe 624 may include multiple product IDs that resolve to specific products based on product identification rules. In certain embodiments, product identification rules resolve products to be billed for a particular transaction based on one or more attributes (e.g., product identifiers) of the transaction. As an example, if the first product ID='001', then product is 'CWD" (Cash Withdrawal). If the product ID='XYZ', then product is 'MOBILEBANKING'. In certain embodiments, it is possible that one transaction may satisfy multiple rules, meaning that multiple products are resolved for a transaction. The different product IDs may be based on the products that are the subject of an agreed contract between users, financial institutions, and/or billing service providers.

At operation 628, the transactions in dataframe 628 are used to generate a further dataframe 630 in which the prices for the different product IDs are resolved. At operation 632, an aggregation operation is executed to generate a user aggregation dataframe 634 in which the amount and value (usage factors) associated with each product for which an account is charged are added up to find the total usage for each product for the account for a particular billing period. Using the data in the user aggregation dataframe 634, the billing event executor 315 assigns a rate at operation 636 that is to be used to calculate the billable charges associated with each aggregated transaction. In certain embodiments, the billing event executor 315 may generate a rate calculation dataframe 638, which includes the assigned rates. In certain embodiments, the rate assigned at 636 may be dependent on the total volume of transactions executed by the account holder, the total amount of each product purchased by the account holder, the dates on which the account holder executed the transactions, the type of currency used by the account holder to execute the transaction, etc. In certain embodiments, such aggregated transaction information may be used to assign a discounted rate, a flat rate, an increased rate, stepped rate etc., that is to be used to charge the account. The rates to be charged for the usage of a product/service for an account may be the subject of an agreed contract between the users and financial institutions.

At operation 640, billing event executor 615 uses the rate and amount in the rate calculation dataframe 638 to create a further dataframe 642 including the billable charges for the transactions assigned at operation 622. In certain embodiments, the billable charges dataframe 642 may be calculated by multiplying the amount of a product purchased by the assigned rate. However, various embodiments may employ calculation rules that vary from a simple multiplication to a complex mathematical formula.

In certain embodiments, the dataframe 642 may be written to the billing system database 325 at operation 644. In certain embodiments, the dataframe 642 may be written directly to the billing system database 325 in the same format as it exists in the billing event executor 315. In certain embodiments, the billing event executor 315 may execute operations on the dataframe 642 to generate one or more further dataframes in a format suitable for storage on the billing system database 325. In certain embodiments, all billable charges for each day in a billing period are consolidated and presented as a single bill line in a customer's invoice. In certain embodiments, there may be a one-to-one correspondence between a billable charge and bill line.

Once the billing event executor 315 has written all the billable charges to the database 325, the billing event executor 315 may notify the billing event driver 312 of this completion at operation 646. Once the billing event driver 312 has received a notice of completion from all billing event executors in the cluster, the billing event driver may execute its post-processing operations 560 and close and cleanup the session at operation 565.

Figure 7:
FIG. 7 illustrates an exemplary set of raw transaction events.

FIG. 7 through FIG. 17 show transactions at various stages of processing in certain embodiments of the present invention. FIG. 7 illustrates an exemplary set of raw transaction events 700. In this example, the raw transaction events 700 include twelve transactions, T1-T12. However, it will be recognized that the number of raw transactions that may be processed in a system designed in accordance with the teachings of the present disclosure are applicable to processing millions of raw transactions. In certain embodiments, the raw transaction events are stored on persistent storage of a billing system.

For purposes of illustration, FIG. 8 shows the use of two partitions for the raw transaction events 700. In this example, the raw transaction events are equally divided between two partitions, Partition 1 and Partition 2. In this example, Partition 1 includes transactions T1-T6, while Partition 2 includes transactions T6-T12.

In certain embodiments, Partition 1 may be processed in a first billing event executor, while Partition 2 may be processed in a second billing event executor. In certain embodiments, Partition 1 and Partition 2 may be processed in different cores of the same billing event executor. Although only two partitions are shown in this example, it will be recognized that the number of partitions used to implement the system of the present disclosure may be a matter of design choice dependent on the number of transactions that are to be processed in parallel.

In certain embodiments, the billing event executors execute a validation process on the raw transaction events in their respective partitions. In this example, the validation process has resulted in removing transactions having invalid data. With reference to FIG. 8, transactions T11 and T12 include invalid data and, as such, the transactions have been eliminated to generate the validated dataframes in the partitions in FIG. 9. More particularly, the validated dataframe in Partition 2 does not include transactions T11 and T12.

FIG. 10 shows an example of split and keyed dataframes 1002 and 1004. In this example, the validated dataframes of FIG. 9 have each been split so that each transaction in the respective dataframe 1002 and 1004 is associated with a single account as shown at 1006 and 1008. Additionally, a set of keys 1010 have been generated for the transactions in dataframe for 1002 and a further set of keys 1012 have been generated for the transactions and dataframe 1004. In the specific example shown here, the key for each transaction is generated using the account ID to be charge for the transaction, the date of the transaction, the product IDs, and currency ID. In certain embodiments, the key may be generated using a hash function applied to two or more of the account ID, the date of the transaction, the product IDs, and currency ID. In certain embodiments, the same key value is assigned to multiple transactions since more than one transaction may have the same account ID, transaction date, product IDs, and currency. In this example, although dataframes 1002 and 1004 include a total of fourteen transactions, the transactions only resolved to six different keys, K1-K6.

Figure 11:
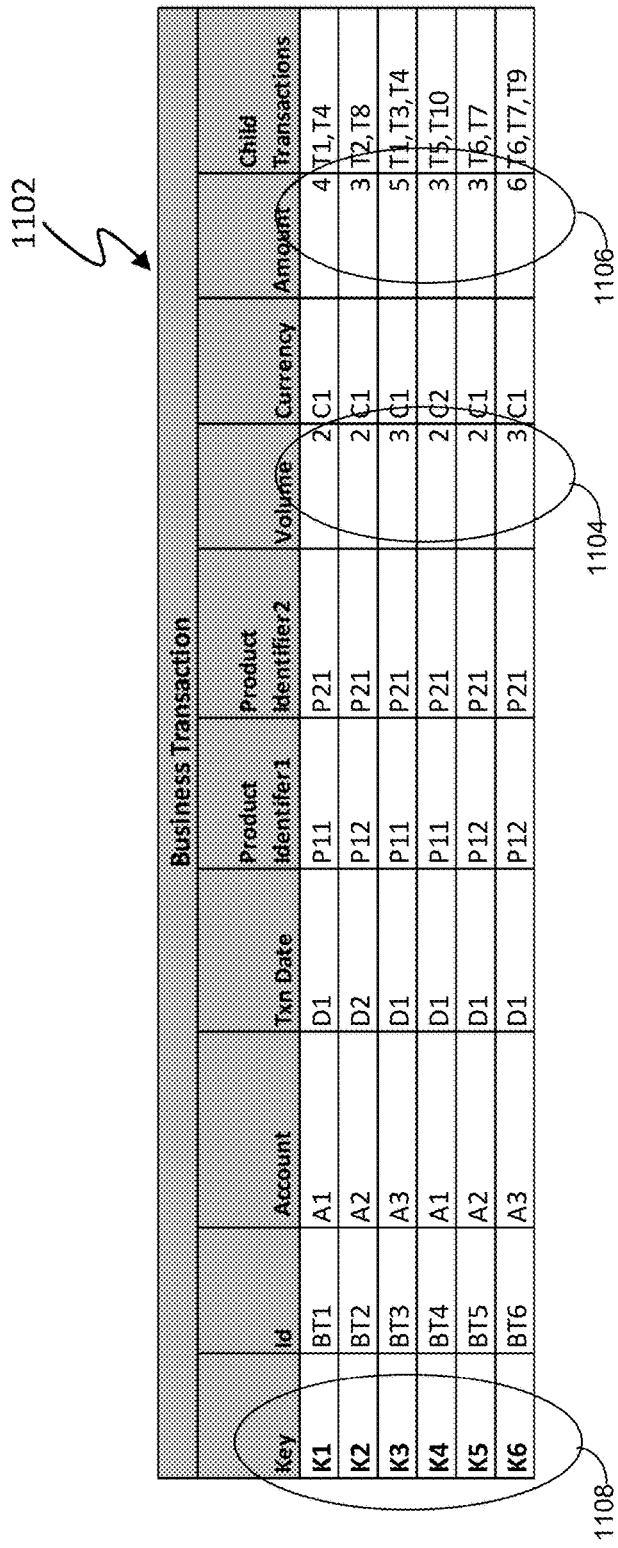
FIG. 11 shows one example of a dataframe that has been generated by the billing event driver after a shuffle and aggregation operations on the dataframes of FIG. 10.

FIG. 11 shows one example of a dataframe 1102 that has been generated by the billing event driver after a shuffle and aggregation operations on dataframes 1002 and 1004 of FIG. 10. During the shuffle and aggregation operations, the billing event driver accesses all of the partitions on the billing event executors of the cluster to generate the dataframe 1102, which is stored at the billing event driver. In this example, the billing event driver has aggregated usage data, such as volume data 1104 and amount data 1106, for each key 1108, and sorted the aggregated data by key in dataframe 1102.

Once the billing event driver has generated dataframe 1102, the transactions within dataframe 1102 are re-partitioned by the billing event driver to different partitions for processing by the respective billing event executors. In certain embodiments, the billing event driver partitions the transactions within dataframe 1102 so that no single partition processes transactions from the same account. With reference to dataframe 1102, the transactions having keys K1 and K4 must be assigned to the same partition since both keys are associated with account A1. Similarly, transactions having keys K2 and K5 must be assigned to the same partition since both keys are associated with account A2. Likewise, transactions having keys K3 and K6 must be assigned to the same partition since both keys are associated with account A3.

In the example shown in FIG. 12, the billing event driver has partitioned the transactions into two partitions. As shown, transactions associated with keys K1, K3, K4, and K6 have been assigned to Partition 1, while transactions associated with keys K2 and K5 have been assigned to Partition 2.

Dataframes 1202 and 1204 are used as a basis for subsequent processing operations. In this example, rules are applied to dataframes 1202 and 1204 to generate the corresponding dataframes 1302 shown in FIG. 13. In this example, rules have been applied to resolve the transactions to particular products 1306, 1308 respectively associated with each keyed transaction. In certain embodiments, the products 1306 and 1308 for each transaction may be resolved using the product identifiers and currencies associated with the transaction. As shown with respect to keyed transaction K4, certain transactions may resolve to multiple products.

FIG. 14 shows dataframes 1402 and 1404 that have been generated using dataframes 1302 and 1304 of FIG. 13. In this example, rules have been applied to resolve prices 1406 and 1408 for the products in each transaction.

FIG. 15 shows dataframes 1502 and 1504 that have been generated using dataframes 1402 and 1404 of FIG. 14. In this example, the billing event executors associated with each partition have executed a usage aggregation operations in which the transactions have been aggregated to the transactions. Usage aggregations based on volume are shown at 1506 and 1508. Usage aggregations based on amounts are shown at 1510 and 1512.

FIG. 16 shows dataframes 1602 and 1604 that have been generated using dataframes 1502 and 1504 of FIG. 15. In this example, the billing event executors associated with each partition have applied rate calculation rules to the transaction data to calculate the amount to be charge for each transaction. The specific rate calculation rules applied to the transactions are identified at 1606 and 1608 and may be based on a number of factors, such as the volume of transactions, the amount of product purchased, etc. The amount to be charged resulting from application of the rate calculation rules are identified at 1610 and 1612.

FIG. 17 shows dataframes 1702 and 1704 that have been generated using dataframes 1602 and 1604 of FIG. 16. In this example, the billing event executors associated with each partition have applied billing rules to the transaction data to place each transaction in a form suitable for use by the billing system. Each transaction may be indexed by a billing charge ID, shown here at 1706 and 1708. The billing rules that are to be applied by the billing system are identified at 1710 and 1712. In certain embodiments, the billing rules correspond to how the billing system is to use each transaction. In certain embodiments, the billing rules may indicate to the billing system that the transactions are to be charged daily, weekly, monthly, etc. In certain embodiments, the billing rules may define to the billing system how the invoice is to be formatted. It will be recognized, based on the teachings of the present disclosure, that a wide range of billing rules may be used by the billing system to implement various billing scenarios.

As will be appreciated by one skilled in the art, the present invention may be embodied as a method, system, or computer program product. Accordingly, embodiments of the invention may be implemented in hardware, in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention. Consequently, the invention is intended to be limited only by the spirit and scope of the appended claims, giving full cognizance to equivalents in all respects.

What is claimed is:

1. A computer-implemented method for executing high-speed transaction processing in a processing cluster having a driver and a plurality of executors, each of the executors configured to process data in at least one respective partition, the computer-implemented method comprising:

mapping billing transaction data stored on a persistent datastore of a billing system to respective partitions of the plurality of executors, wherein raw billing events are assigned to executors of the plurality of executors, and different sets of billing transaction data are mapped to different partitions of the executors of the plurality of executors, for parallel processing of the billing transaction data, wherein the billing transaction data includes at least a transaction date, an account ID, a product ID, and a usage factor for the billing transaction;

generating, by the executors of the plurality of executors, a key for each billing transaction in the respective partition, wherein the key is generated based, at least in part, on the account ID, transaction date, and product ID of the billing transaction;

shuffling, by the driver, the keyed billing transactions on the respective partitions of the plurality of the executors of the plurality of executors to generate a set of transactions aggregated by the same key;

mapping, by the driver, the set of aggregated transactions to partitions of the plurality of executors so that no two partitions have an aggregated transaction for the same account ID;

aggregating, by the executors of the plurality of executors, usage factors of the billing transactions in the respective partition to generate billable charge information in a format for use by the billing system to generate billing invoices; and storing, by the executors of the plurality of executors, the billable charge information on a persistent datastore of the billing system.

2. The computer-implemented method of claim 1, wherein
   the key for each billing transaction is generated using a hash function applied to the transaction date, the account ID, and product ID.

3. The computer-implemented method of claim 1, further comprising:
   validating, by the executors of the plurality of executors, the billing transactions mapped to the respective partition of the executors of the plurality of executors.

4. The computer-implemented method of claim 1, wherein
   the raw billing transaction data stored on the persistent datastore of the billing system are mapped as resilient distributed data sets to the respective partitions of the executors of the plurality of executors.

5. The computer-implemented method of claim 1, wherein
   the raw billing transaction data further includes a secondary account ID.

6. The computer-implemented method of claim 5, further comprising:
   executing, by the executor, a split operation to split the set of transactions by account so that each transaction of the split set of transactions is associated with a single account ID.

7. The computer-implemented method of claim 1, wherein
   the usage factor includes a volume for the transaction or amount of product that is the subject of the transaction.

8. A computer-implemented method for executing high-speed transaction processing in a cluster having a billing driver and a plurality of parallel operating executors, the method comprising:

assigning, by the driver, a range of raw billing transactions that are to be respectively processed by each executor of the plurality of parallel operating executors;

accessing, by each executor of the plurality of parallel operating executors, raw billing transaction data assigned to the respective executor by the driver, wherein the executors of the plurality of parallel operating executors access the raw billing transaction data from a persistent datastore of a billing system, wherein different executors of the plurality of parallel operating executors access different sets of raw billing transaction data for parallel processing in the cluster, wherein the raw billing transaction data for a billing transaction includes at least a transaction ID, a transaction date, an account ID, and a product ID, a transaction rate, and a transaction volume;

mapping, by the executors of the plurality of parallel operating executors, the set of accessed transactions to a raw billing transaction dataframe of the executor;

validating, by the executors of the plurality of parallel operating executors, the set of accessed transactions in the raw billing transaction dataframe to generate a validated transaction dataframe;

generating, by the executors of the plurality of parallel operating executors, a keyed transaction dataframe from the validated transaction dataframe, wherein each transaction in the keyed transaction dataframe includes a key generated, at least in part, from the account ID, transaction date, product ID, and amount of a corresponding transaction in the validated transaction dataframe;

shuffling, by the driver of the cluster, the keyed transaction dataframes of the plurality of executors to generate an aggregated transaction dataframe at the driver, wherein the aggregated transaction dataframe is aggregated by the same key;

partitioning, by the driver, the set of aggregated transactions to partitions of the plurality of executors so that no two partitions have an aggregated transaction for a same account ID;

processing, by the executors of the plurality of parallel operating executors, the set of aggregated transactions in the corresponding partition to generate billable charge information; and storing, by the executors of the plurality of parallel operating executors, the billable charge information on persistent datastore of the billing system.

9. The computer-implemented method of claim 8, wherein
each keyed transaction of each keyed transaction dataframe is aggregated by volume and amount.

10. The computer-implemented method of claim 8, wherein
the raw billing transaction dataframe, the validated transaction dataframe, and the keyed transaction dataframe are immutable objects that are processed in a cache memory of the executor.

11. The computer-implemented method of claim 10, wherein
the raw billing transaction dataframe, the validated transaction dataframe, and the keyed transaction dataframe are distributed data sets.

12. The computer-implemented method of claim 8, wherein the key for each transaction in the keyed transaction dataframe is generated using a hash function applied to two or more of the transaction date, the account ID, and product ID of a corresponding transaction in the validated transaction dataframe.

13. The computer-implemented method of claim 8, wherein
the billing transaction data further includes a secondary account ID.

14. The computer-implemented of claim 13, wherein
the keyed transaction dataframe includes split transactions so that each secondary account ID is associated with its own transaction in the keyed transaction dataframe, wherein the key for a split transaction having a secondary account is generated, at least in part, from the secondary account ID, transaction date, product ID, and amount of a corresponding transaction in the validated transaction dataframe.

15. A system for executing high-speed transaction processing comprising a processor and a processing cluster, the processing cluster comprising:
a billing driver;
a plurality of executors in communication with the billing driver, wherein each executor of the plurality of executors include a respective cache memory;
wherein the billing driver is configured to:
assign a subset of raw billing transactions to each executor of the plurality of executors for processing, wherein the billing driver assigns different subsets of raw billing transactions to different executors, wherein billing transactions in the subset of raw billing transaction include at least a transaction date, an account ID, a product ID, and a usage factor for the billing transaction;
wherein the executors of the plurality of executors are configured to:
access the assigned subset of raw billing transactions from persistent storage of a billing system;
execute pre-processing operations on the assigned subset of raw billing transactions to generate a keyed transaction data object that is aggregated by key, wherein the key is generated based, at least in part, on the account ID, transaction date, and product ID of each transaction;
wherein the billing driver is further configured to:
shuffle the keyed billing transaction data objects retrieved from partitions of the plurality of executors to generate a set of transactions aggregated by the same key;
map the set of aggregated transactions to partitions of the plurality of executors so that no two partitions have an aggregated transaction for the same account ID;
wherein the executors are further configured to:
aggregate usage factors of the billing transactions in the respective partition to generate billable charge information in a format for use by the billing system to generate billing invoices; and
store the billable charge information on a persistent datastore of the billing system.

16. The system of claim 15, wherein
the key for each billing transaction is generated using a hash function applied to the transaction date, the account ID, and product ID.

17. The system of claim 15, wherein the executors are further configured to
validate the raw billing transactions assigned to the executor.

18. The system of claim 15, wherein
the raw billing transaction data stored on the persistent datastore of the billing system are mapped as resilient distributed data sets to respective partitions of the each of the executors of the plurality of executors.

19. The system of claim 15, wherein
the raw billing transaction data further includes a secondary account ID.

20. The system of claim 19, wherein the each of the executors of the plurality of executors are further configured to: execute a split operation to split the set of transactions by account so that each transaction of the split set of transactions is associated with a single account ID.

* * * * *